United States Patent Office 3,330,282
Patented July 11, 1967

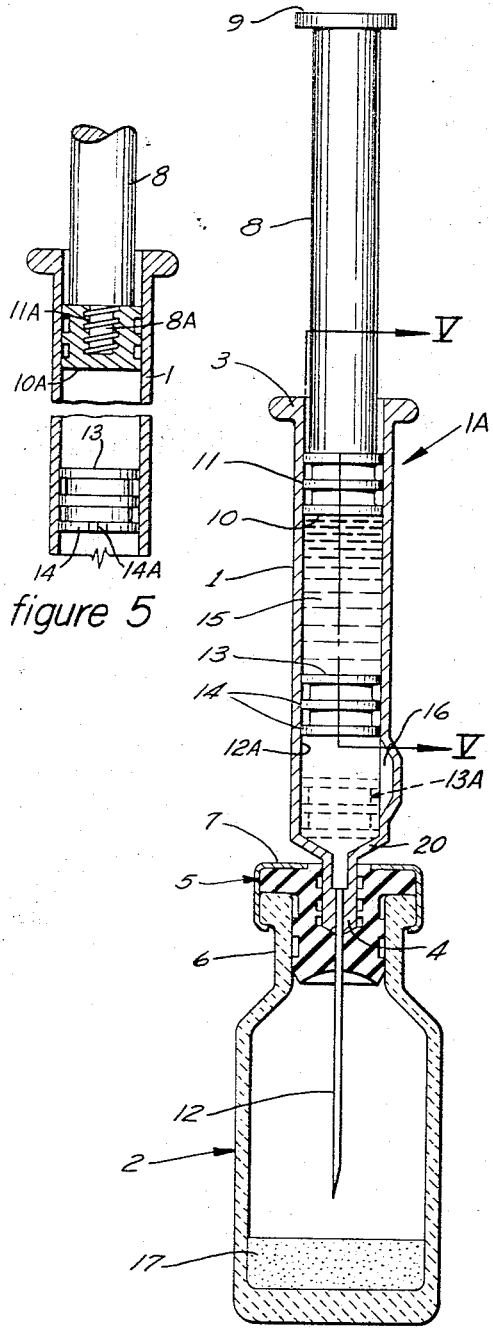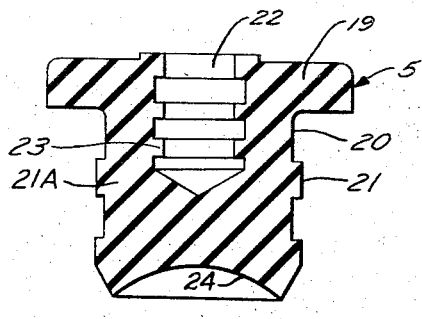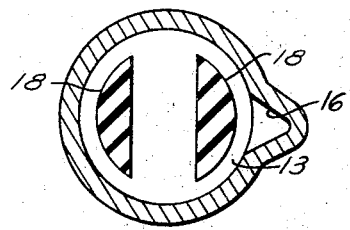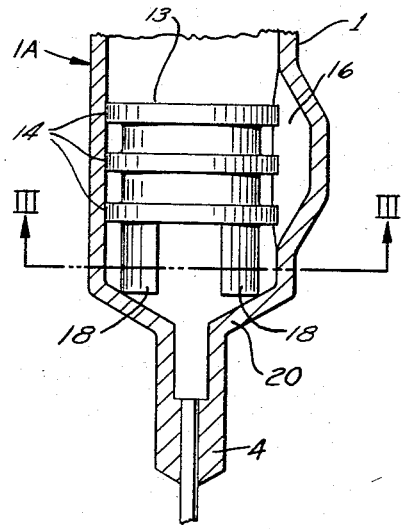
figure 1
figure 2
figure 3
figure 4
figure 5
INVENTORS
MELVIN J. VISSER
STUART V. WILSEY
BY
ATTORNEY

3,330,282
COMBINATION SYRINGE AND VIAL MIXING CONTAINER
Melvin J. Visser, Portage, and Stuart V. Wilsey, Kalamazoo, Mich., assignors to The Upjohn Company, Kalamazoo, Mich., a corporation of Delaware
Filed Aug. 21, 1964, Ser. No. 391,221
7 Claims. (Cl. 128—272)

This invention relates to containers and, more particularly, to compartmented containers for separate maintenance of materials prior to their use in combination.

Frequently it is desired to package in a single unit dry solids and a reconstituting diluent or separately maintained liquids for mixing prior to use, as in the separate storage of sterile components of a mixture to be injected into the human or animal body. Much attention has been accorded the development of such packages for the pharmaceutical industry in recent years. Various combinations of multiple-compartmented injection units have in fact been developed, but results thus far have proved unsatisfactory for one or more of a variety of reasons which the containers of this invention are designed to overcome.

The device of this invention is remarkably simple in construction and economical to fabricate and fill. More important, however, is the provision of a unit embodying components with which the physician is already familiar. Where reconstitution or mixing of ingredients is necessary prior to use he is thus enabled to respond in emergencies without time-consuming reflection on mechanics of operation. In this respect the device hereof, with unique coaction between its basic elements, is a departure from compartmented injection devices of the art, which demonstrate remarkable ingenuity but too often involve costly or complicated features that detract from their practical usefulness.

The device of this invention comprises essentially means defining a mixing chamber for containing a first sterile ingredient for injection to which is affixed means defining a storage chamber for containing a second sterile fluid ingredient for injection. A penetrable plug seals the opening in the upper end of the mixing chamber. Communication between the mixing and storage chambers is provided by a cannula or needle mounted in the lower end of the storage chamber and extending through the penetrable plug into the mixing chamber. The storage chamber is closed at its open, upper end by a piston mounted on a plunger and slidable in said storage chamber. A free piston within said storage chamber defines, with the plunger-mounted piston, a liquid storage compartment within the storage chamber. Bypass means in the storage chamber extends from below the lowest point of effective closure of the storage chamber by the free piston upwardly a distance greater than the height of effective closure of said free piston. With liquid stored between the free piston and plunger-mounted piston, downward movement of the plunger hydraulically forces the free piston downwardly to a position adjacent the bypass, thereby permitting liquid in the storage compartment to pass around the free piston, through the cannula and into the mixing chamber.

In its preferred embodiment the device of this invention comprises a mixing vial containing a first sterile ingredient for injection atop of which is positioned a syringe containing a second sterile fluid ingredient, such as a diluent, for injection. The cannula of the syringe extends into the vial through a penetrable plug which seals the syringe into the neck of the vial, forms a closure for the vial, and affords rigidity to the mounted assembly. A free piston contained in the barrel of the syringe defines, with the plunger-mounted piston of the syringe, a liquid storage compartment for the second sterile fluid ingredient or diluent. The free piston is a cylindrical body having a plurality of circumferentially-extending rings of resilient material. At least one substantially vertical bypass means, such as an internal groove, is positioned in the syringe barrel to extend below the lowest point of effective closure of said storage chamber by the free piston and upward a distance greater than the height of the free piston. Downward movement of the plunger hydraulically forces the free piston downwardly into a position adjacent the bypass means. Continued downward movement of the plunger causes liquid from the storage compartment to pass around the free piston, through the cannula and into the vial.

In the drawings,

FIGURE 1 is a partial central cross-section of a syringe and vial united in the manner described.

FIGURE 2 is an enlarged fragment of FIGURE 1 showing a modified free piston positioned for cooperation with the bypass.

FIGURE 3 is a cross-section of the modified free piston taken on the line III—III of FIGURE 2.

FIGURE 4 is an enlarged cross-section of the penetrable plug appearing in FIGURE 1 for receiving the syringe and sealing the vial contents from the atmosphere.

FIGURE 5 is a sectional view taken along the line V—V in FIGURE 1 and showing modified plunger and pistons.

Referring more specifically to the drawings, it will be seen from FIGURE 1 that the cylindrical barrel 1 of the syringe 1A is removably mounted atop vial 2. Barrel 1 terminates at its upper end in a finger-engageable collar 3 and at its lower end in a boss 4 of reduced diameter. Penetrable plug 5 is secured in neck 6 of vial 2 and has a central recess 22 which receives the boss 4 of barrel 1, lending rigidity to the assembly and sealing the interior of vial 2 against the atmosphere. Overseal 7 secures plug 5 in vial 2. Plunger 8 with a thumb-engageable flange 9 at its upper end is slidably mounted in barrel 1 and terminates at its lower end in piston 10. Rings 11 on piston 10 afford slidable and sealing engagement with the interior surface of barrel 1. In the completed assembly, cannula 12 is mounted in boss 4, so that it communicates with the chamber 12A in barrel 1 and extends into vial 2. Free piston 13, having a plurality of circumferentially-extending rings 14, is disposed within barrel 1 and defines, with piston 10, liquid storage compartment 15 within the chamber 12A of barrel 1. Bypass groove 16 in the interior wall of barrel 1 is positioned at or near the bottom of said barrel 1 and extends upward a distance greater than the height of the effective closure of free piston 13. In this embodiment, such height extends from the upper edge of the upper ring 14 to the lower edge of the lower ring 14 on the piston 13. Depression of plunger 8 hydraulically forces free piston 13 downwardly adjacent bypass groove 16. As pressure from plunger 8 and piston 10 continues, liquid from compartment 15 is forced into bypass groove 16, around free piston 13, through cannula 12 and into vial 2 for admixture with medicament 17 therein. If desired, at least one vertical groove 14A (FIGURE 5) can be cut in lower ring 14 to facilitate liquid bypass.

FIGURE 2 shows free piston 13 modified by providing a pair of legs 18. For convenience in manufacture of the syringe 1A it is sometimes desirable to position bypass 16 a short distance above tapered portion 20 at the lower end of barrel 1. In such event, free piston 13 seated at its lowermost, broken line position 13A (FIGURE 1) may block passage of liquid through bypass 16 into cannula 12. Provision of at least two legs 18 (FIGURE 2) prevents this difficulty by supporting free piston 13 above the pass 16 so that liquid can flow around its lower edge and into cannula 12.

FIGURE 3 shows the modified free piston 13 from the bottom with legs 18 depending therefrom. These legs support free piston 13 and permit bypass of liquid from compartment 15 (FIGURE 2) around said free piston.

FIGURE 4 shows more clearly a favored form of plug 5. Upper flange section 19 has a diameter larger than the internal diameter of neck 6 of vial 2. Body section 21A is of substantially the same diameter as the internal diameter of neck 6 and has at least one ring 21 intermediate its length to afford a positive seal against said neck 6. A central recess 22 extends downwardly into body section 21A intermediate its depth, said recess being of substantially the same diameter as boss 4. At least one circumferential ridge 23 extends into recess 22 from body section 21A for sealing engagement with said boss 4. The lower extremity of body section 21A presents a concave surface 24, which provides a low point for complete withdrawal of contents from the inverted vial after mixture of the ingredients.

All parts in contact with medicament, with the exception of plug 5, piston 10 and free piston 13, can be made of glass, plastic or other suitable material that can be sterilized. Plug 5, piston 10 and free piston 13 are fabricated from materials such as high quality rubber or resilient plastic that will not impart chemical or particulate contamination to the individual ingredients, will remain stable against such individual ingredients or their mixtures and are capable of withstanding heat or chemical sterilization.

Where it is desired to reduce the overall height of the package, plunger 8 can be provided at its lower end with a threaded plunger head 8A (FIGURE 5) for threadable engagement with internal threads 11A of the piston 10A. The plunger can then be disengaged from the piston and maintained separate until use.

A particularly desirable feature of the present device is the ease with which it can be filled under aseptic conditions. With all parts and ingredients rendered sterile, the solid or liquid medicament 17 is charged to vial 2, plug 5 inserted in neck 6 and overseal 7 applied. The syringe is filled and assembled and cannula 12 is inserted in recess 22 and through plug 5 until boss 4 seats firmly in said recess. It is apparent that other sequences can be employed, but the important aspect to be noted is the freedom from difficult assembly problems encountered here which commends this device to conventional manufacturing techniques.

What is claimed is:
1. In combination:
   (1) A mixing chamber for containing a first sterile ingredient for injection and having an open end;
   (2) A storage chamber for containing a sterile fluid ingredient for injection affixed to said mixing chamber;
   (3) Penetrable plug means sealing said open end of said mixing chamber;
   (4) A cannula extending from one end of said storage chamber through said plug into said mixing chamber and communicating therebetween;
   (5) A plunger mounting a piston slidable in said storage chamber;
   (6) A free piston situated in said storage chamber between said plunger-mounted piston and said cannula, and defining, with said plunger-mounted piston a fluid storage compartment in said chamber, said free piston comprising a cylindrical body having a plurality of circumferentially extending rings of resilient materal, and at least two legs depending from the lower surface thereof, and
   (7) Bypass means extending below the lowest point of said fluid storage compartment and having a longitudinal extent greater than the height of said free piston, whereby downward movement of said plunger-mounted piston will hydraulically force said free piston into a position wherein said legs engage said one end of said storage chamber, thereby permitting fluid into said storage compartment to flow through said bypass and said cannula, into said mixing chamber, whereupon the resulting fluid mixture can be withdrawn from said mixing chamber into said storage chamber and said storage chamber separated from said mixing chamber for use.

2. In combination:
   (1) A vial with a penetrable plug closure for containing a first sterile ingredient for injection;
   (2) A syringe mounted in said penetrable plug and having a barrel for containing a sterile fluid ingredient for injection, said syringe having a cannula connected to the lower end of and communicating with the interior of said barrel, said cannula extending through said plug into said vial, said syringe having a plunger with a piston disposed within sad barrel;
   (3) A free piston contained in the barrel of said syringe defining, with the plunger-mounted piston of said syringe, a fluid storage compartment, said free piston having a cylindrical body with a plurality of circumferentially-extending rings of resilient material, at least two legs depending from the lower surface of said free piston and arranged for engagement with said lower end of said barrel, and
   (4) At least one vertical bypass groove in the syringe barrel extending below the lowest point of said fluid storage compartment and having a longitudinal extent greater than the height of said free piston, whereby downward movement of the plunger of said syringe will hydraulically force said free piston into a position wherein said legs engage said lower end of said barrel, thereby permitting fluid to flow through said bypass and said cannula into said vial, whereupon the resulting fluid mixture can be withdrawn from said vial into said syringe and said syringe separated from said vial for use.

3. A device for containing sterile ingredients for injection, comprising:
   first means defining a mixing chamber for containing a first ingredient and having an opening communicating with said chamber;
   second means defining an elongated storage chamber of uniform cross section for containing a fluid ingredient;
   plunger means having first piston means slideably disposed in said storage chamber;
   a cannula having one end thereof secured in a liquid-tight connection to one end of said second means and in communication with said storage chamber;
   second piston means movably positioned in said storage chamber between said first piston means and said cannula, said first and second piston means being adapted to define the end walls of a liquid-tight compartment therebetween;
   passage means in said second means for bypassing said second piston means when it is in a selected position in said storage chamber;
   liquid-tight and penetrable connection means firmly attached to said first means for sealing the opening therein, and releasably connecting and firmly holding said second means with respect to said first means, said cannula means penetrating said connection means and communicating with said mixing chamber, said plunger means being movable in said storage chamber for effecting movement of said second piston means into said selected position and then effecting movement of said fluid ingredient through said passage means and said cannula into said mixing chamber.

4. The device of claim 3 wherein said storage chamber is defined by cylindrical wall means, and said passage means comprises:

at least one groove means recessed in said wall means and extending from a point on one side of said second piston to a point on the opposite side thereof when said second piston is in said selected position.

5. The device of claim 3 wherein said storage chamber is defined by cylindrical wall means and said second piston means has a pair of spaced, concentric and annular ridges extending radially therefrom and snugly engaging said wall means; and wherein said passage means comprises a notch in the annular ridge nearest said cannula and at least one groove means recessed in said wall means and extending from a point between said ridges to a point between said pistons when said second piston is in said selected position.

6. A device for maintaining separately and thereafter mixing sterile ingredients and for injecting the mixture into a body, comprising in combination:

vial means having an opening defined by a neck and being capable of containing a sterile first ingredient;

penetrable plug means sealingly disposed in the neck of said vial means;

syringe means having a chamber for containing a sterile fluid ingredient, said syringe means having a plunger with first piston means in said chamber and a cannula connected to one end of said syringe means and communicating with said chamber, said cannula having a tip portion penetrating said plug means;

second piston means sealingly positioned in said chamber between said first piston means and said cannula;

passage means in said syringe means for bypassing said second piston means when it is in a selected position near said cannula; and cooperable means on said syringe means and said plug means releasably connecting and firmly holding said syringe means with respect to said vial means, said cannula penetrating said plug means and extending into communication with said vial means, said plunger means being capable of effecting movement of said second piston means into said selected position and then effecting movement of said fluid ingredient through said passage means and said cannula into said vial means.

7. The device of claim 6 in which the penetrable plug means comprises:

an upper flange section of diameter greater than the diameter of the opening in said neck;

a body section of substantially the same diameter as the diameter of said opening and having at least one circumferentially-extending ring intermediate its length to afford a positive seal against said neck;

a concave lower surface on said body section, whereby a low point is provided for complete withdrawal of fluid mixture from said vial when it is inverted;

said cooperatble means comprising means in said body section defining a central bore extending downwardly from an upper surface of said body section intermediate its depth, said body section having at least one circumferential ridge extending into said bore, and a reduced portion on said one end of said syringe removably disposed in said bore and firmly gripped by said ridge.

References Cited

UNITED STATES PATENTS

| | | | |
|---|---|---|---|
| 2,591,046 | 4/1952 | Brown | 128—218 |
| 2,666,438 | 1/1954 | Ogle | 128—218 |
| 3,070,094 | 12/1962 | Sarnoff et al. | 128—272 |

RICHARD A. GAUDET, *Primary Examiner.*

DALTON L. TRULUCK, *Examiner.*

UNITED STATES PATENT OFFICE

CERTIFICATE OF CORRECTION

Patent No. 3,330,282                                July 11, 1967

Melvin J. Visser et al.

It is hereby certified that error appears in the above numbered patent requiring correction and that the said Letters Patent should read as corrected below.

Column 3, line 1, for "pass" read -- lower end of the bypass --; line 71, for "materal" read -- material --; column 4, line 5, for "into" read -- in --; line 20, for "sad" read -- said --; column 6, line 21, for "cooperatble" read -- cooperable --.

Signed and sealed this 1st day of April 1969.

(SEAL)

Attest:

Edward M. Fletcher, Jr.                             EDWARD J. BRENNER

Attesting Officer                                    Commissioner of Patents